United States Patent [19]

Napadow

[11] Patent Number: 4,601,236
[45] Date of Patent: Jul. 22, 1986

[54] PUMP-LESS PAINT SPRAY BOOTH

[75] Inventor: Stanley C. Napadow, Elgin, Ill.

[73] Assignee: Protectaire Systems Co., Elgin, Ill.

[21] Appl. No.: 609,744

[22] Filed: May 14, 1984

[51] Int. Cl.$^4$ ............................................. B05B 15/12
[52] U.S. Cl. ............................. 98/115.2; 55/DIG. 46
[58] Field of Search ............... 55/DIG. 46; 98/115.1, 98/115.2; 118/326, DIG. 7

[56] References Cited

U.S. PATENT DOCUMENTS

| 4,276,064 | 6/1981 | Gerdes | 98/115.2 X |
| 4,290,348 | 9/1981 | Morgan et al. | 98/115.2 |

FOREIGN PATENT DOCUMENTS

| 2704830 | 8/1977 | Fed. Rep. of Germany | 118/326 |
| 2740935 | 3/1979 | Fed. Rep. of Germany | 118/DIG. 7 |
| 51-10613 | 4/1976 | Japan | 118/326 |

Primary Examiner—Harold Joyce
Attorney, Agent, or Firm—Fitch, Even, Tabin & Flannery

[57] ABSTRACT

A wet pump-less spray painting booth is provided that more efficiently removes overspray paint particles from the air and uses substantially less make-up water than prior designs of wet pump-less booths. In a rear air cleaning section of the booth, blower-generated air flow sucks water from a lower reservoir up through ducts into an upper plenum where the air and water impact against a splash plate, creating a turbulent mix of air and water. Water from the upper plenum drains through tubes to an upper reservoir and overflows the upper reservoir along a sheet, the bottom edge of which is spaced a substantial distance from the lower reservoir, creating a water curtain. Air flow is through a user portal where the air becomes laden with overspray paint particles, through the water curtain below the sheet at a relatively low velocity to partially clean the air of paint particles, upward through the ducts, into the turbulent mix of air and water where the air is further cleaned and upward through the plenum to an exhaust.

11 Claims, 2 Drawing Figures

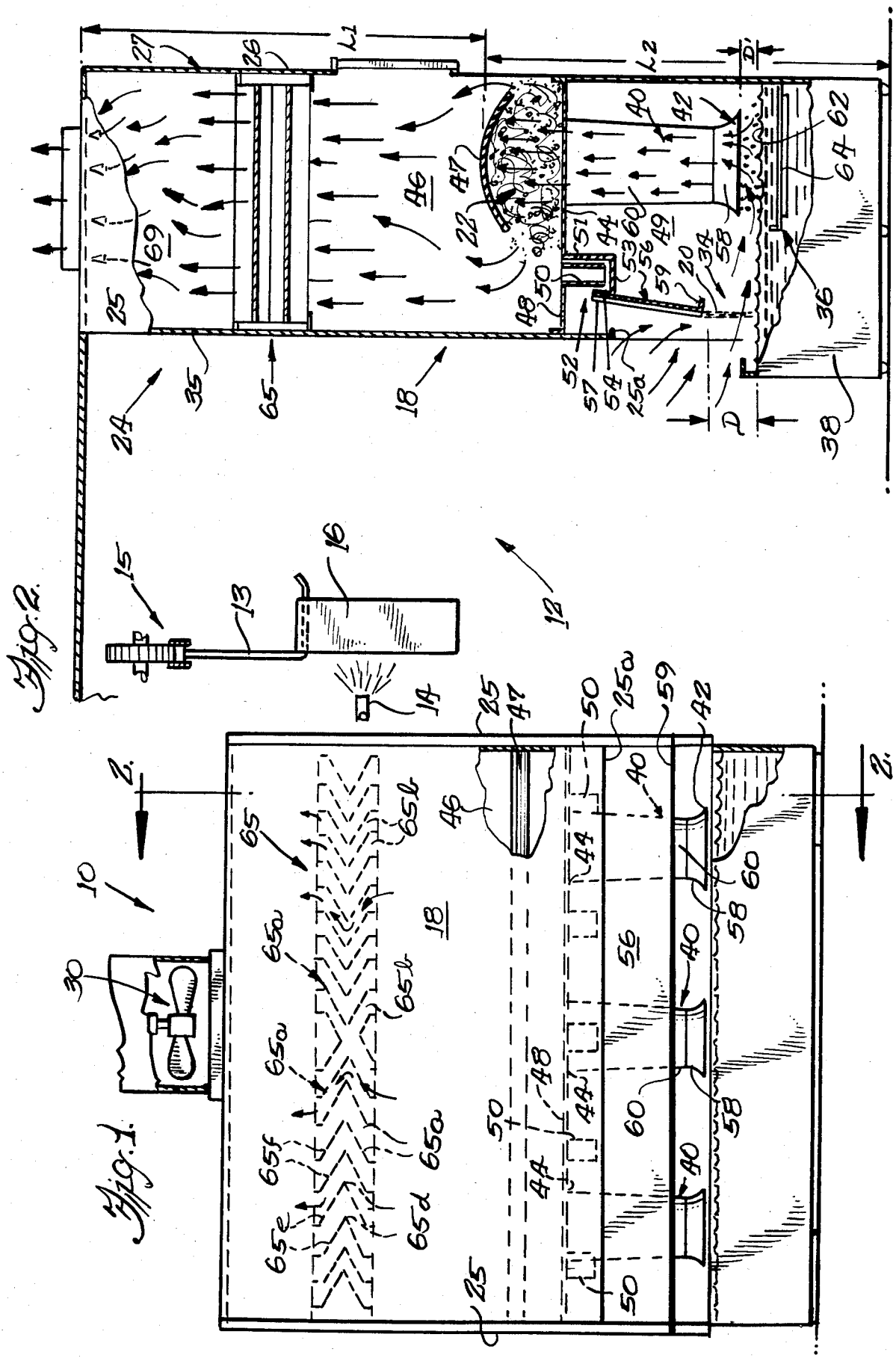

PUMP-LESS PAINT SPRAY BOOTH

The present invention relates to air cleaning systems and more particularly to a spray booth having an air cleaning system to remove airborne particles to alleviate contamination of the surrounding atmosphere.

Spray booths are used for various purposes and generate airborne particles which are usually removed by some form of filtering equipment before the air from the spray booth is discharged. By way of example only, the present invention will be described in connection with a spray booth for painting articles. Spray painting is a procedure which is both dirty and hazardous in that particles of obnoxious and/or toxic substances are widely dispersed through the air. Spray in the absence of adequate filtering apparatus results in an environment which is unhealthy to workers, and may result in contamination of the larger environment around such a plant. The need to protect workers as mandated by government regulations requires that spray painting be carried out in booths in which the contaminated paint laden air is directed away from the workers and filtered to remove paint particles therefrom. Dry filter methods and wet filter methods have previously been used to clean air in spray painting booths.

In dry filter booths, paint laden air is passed through filters such as fibrous filters to remove the paint particles therefrom. Of course, once sufficient paint has been accumulated in the filters, the air flow therethrough drops substantially and the air flow may not be sufficient to meet standards. Ultimately, the filters may become so clogged that they are rendered useless. Filters from a dry filter booth may have to be changed daily with resulting expense in labor and filter material.

In a typical wet spray booth, disposed behind the article being sprayed is a curtain of water cascading from an upper reservoir, down a sheet of material and from the lower edge of the sheet down into a lower reservoir. The curtain of cascading water is contacted by paint laden air and the water collects a substantial portion of the overspray paint particles, The air flow that passes below the lower edge of the sheet may be subsequently further cleaned by sprays or mists of water before the air is exhausted.

Recirculating pumps provide one means for returning water from the lower reservoir to the upper reservoir to maintain the cascading sheet of water. A major disadvantage to the use of pumps to recirculate water in paint spray booths is that pumps tend to become clogged with paint particles, resulting in down time and maintenance expense. The paint particle conglomerate and comprise large, sticky masses that can not be pumped by the usual water pumps. The pumps may become clogged with sticky paint particles. If the paint particles are smaller and are pumped, they may be caught in the nozzles of spray pipes. Because of such problems, some users do not want spray booths having pumps for pumping the water. As an alternative, pump-less spray booths often called "no pump" spray booths have been developed in which a powerful exhaust blower provides an air flow through the booth that is sufficiently powerful to entrain and lift substantial amounts of water upward through ducts that open at their lower end closely adjacent the lower reservoir and extend to a partitioned upper region of the booth. Water collected in the upper region of the booth drains into the upper reservoir from where it overflows onto the sheet to form the curtain of water.

While a pump-less booth eliminates the problem of pump clogging, other problems remain, including relatively low efficiency of paint removal. For example, the no pump booth described in U.S. Pat. No. 4,290,348 has a paint removal efficiency of only about 94%. The low paint removal efficiency of pump-less booths makes it difficult to meet government environmental requirements. Heretofore, a major disadvantage of pump-less booths is that substantial amounts of water are discharged through the exhaust. Water droplets leaving the booth and exhausted after make the blower and the surrounding roof area wet. Further, wet particles of water are often colored and may drop onto surrounding areas at the discharge area and discolor it. The loss of water must be made up and can be an additional expense.

It is a general object of the present invention to provide a new and improved paint spray booth having a pump-less wet cleaning system.

The present invention provides an improved paint spray booth including a front user portal in which a spray of paint is directed at an object and a rear air-cleaning portion whereat a blower creates a flow of air through the booth from front to rear and where paint particles are removed from the flowing air by recirculating water, including a sheet or curtain of cascading water and a turbulent mix of air and water droplets. The curtain of water is created by water overflowing an upper water reservoir along a vertical sheet that has a lower edge spaced above the surface of a lower water reservoir. Recirculation of the water is effected entirely by the blower which draws water through ducts extending from just above the lower reservoir to a partitioned plenum above the upper reservoir. The plenum has a cross section which is large relative to the cross section of the ducts, and a substantial height whereby the flow of air through the ducts, which is of sufficient velocity to entrain water from the lower reservoir, is slowed for a sufficient distance that the air in the upper end of the plenum is incapable of carrying water droplets, i.e., is at a sub-entrainment velocity from the booth. Disposed in the plenum just above the ducts and well below the upper end of the plenum is a splash plate which creates a very substantial turbulence of water and air and a thorough mixing of the air and water resulting in a substantial contact between water droplets and any paint particles not yet washed from the air. The preferred splash plate reverses the direction of air flow to limit straight upward travel towards the upper end of the plenum and possibly through the exhaust. An improved water curtain is promoted by spacing the lower edge of the water curtain sheet substantially above the surface of the lower reservoir relative to the lower ends of the ducts, whereby the air flow velocity passing below the sheet is substantially reduced relative to the air velocity at the entrance to and through the ducts, resulting in paint particles being impinged by the water at a better rate than heretofore.

These and other advantages of the invention will now be described in greater detail in the following detailed description of a preferred embodiment with reference to the drawings of which:

FIG. 1 is a front-to-rear cross-sectional view of a spray booth embodying various features of the present invention;

FIG. 2 is a rear elevation view, partially cut away of the booth of FIG. 1.

Illustrated in FIG. 1 is a pump-less wet spray booth 10 embodying various features of the invention and which provides increased paint particle removal efficiency while requiring far less make-up water than conventional no pump booths. The front of the booth is a housing that defines a user portal 12 in which a user directs a paint spray gun 14 or the like at an article 16 suspended such as on a conveyor hook 13 of a conveyor 15 with in the booth. The user portal 12 may have a variety of features and accessories known in the art, such as the conveyer system 15 for carrying successive objects laterally across the booth in front of the user. Alternatively the article may be manually handled and support on a table in front of the user. Electrical conducting means may also be provided to permit electrostatic spraying of the article. At the rear of the booth 10 is an air cleaning section 18 wherein paint laden air that is drawn through the booth is cleaned, initially by a first water wash means having a curtain 20 of cascading water and subsequently through a second water wash means including a turbulent spray 22 of water.

The air cleaning apparatus is housed in a vertically elongated rectangular housing 24, including a front wall 35, a rear wall 27 and opposed side walls 25. The walls are each formed from a plurality of bolted metal panels that may be disassembled for major maintenance or cleaning. Removable panels, such as panel 26, of the rear wall 27 of the housing, provide access to the interior for more regular routine maintenance. Located above the housing is a powerful centrifugal blower 30 that pulls air through the booth from the user portal 12, through a rectangular air flow opening 34 at the lower end of a water flow sheet 56 from which cascades the water curtain 20. The air flows across the top of body of water in the reservoir to the lower ends of the ducts and then up through the ducts and into a first plenum 46 and then through moisture eliminators 65 into a second plenum 69.

Although all of the air is pulled through the booth 10 by the centrifugal blower 30, air flow velocity is not constant through the booth and is generally a function of the cross-sectional area of the air flow passageway at any particular point. By adjustment of relative air flow passageway size, air flow velocity may be increased substantially to lift water particles and air borne paint particles into the second water wash 22.

The blower 30 is sufficiently powerful, usually to provide a negative pressure of 4.5 inches of water static pressure, which is sufficient to uplift water from a lower reservoir 36 to create the continuous water circulation that removes over spray paint particles from the air flowing through the booth. Briefly, water flow in the cleaning section 18 is as follows. The major portion of the water volume resides in a lower reservoir 36 contained in a tank portion 38 of the housing. Water is entrained by a high velocity flow of air through a plurality of vertical ducts 40 each having a lower end 42 disposed a predetermined height usually four to five inches above the water surface of the reservoir and opening at its upper end 44 into a first plenum 46 that extends upward to the blower chamber 28. Water droplets entrained by the air and lifted through the ducts 40 to the plenum 46 and hits a turbulence creating means in the form of a turbulence panel or plate 47 and is reversed in direction and violently turned in different directions to wet the paint particles in the air and the water droplets eventually drop on and accumulate on the floor panel 48 that partitions the plenum from a lower region 49 of the booth, and descends through drain tubes from the first plenum 46 to an upper reservoir 52 at the upper end of the lower region. The upper reservoir is defined by a vertical wall 51 that depends from the partition paneling, a lower horizontal wall 53 and an upstanding front wall or weir 54. As the water drains continuously into the upper reservoir, it continuously overflows the weir 54 and downward along a sheet 56 that depends from the weir. The weir 54 and the sheet 56 extends across the width of the booth from side wall to side wall 25 to provide the broad curtain 20 of cascading water. Water falls from the lower edge of the sheet 56 as the first water wash curtain 20 wetting paint particles and carrying the wet particles down into the lower reservoir 36.

In the illustrated embodiment, the tank 38 at the lower end of the air cleaning section 18 extends slightly forward of the rest of the cleaning section housing 24, which otherwise has a uniform rectangular cross section. A typical tank 38 is filled to a depth of about twenty inches and measures about four feet in a front to rear direction. Disposed in the tank (not shown) is level sensing apparatus, and replacement water is automatically supplied to the reservoir to prevent the water level from dipping below a predetermined sensed level.

The booth of the present invention has a water curtain sheet 56 across which water flows continuously that is short vertically between an upper edge 57 at the weir 54 and a lower edge 59 relative to water curtain sheets used in other wet spray painting booths. The front wall 35 of the cleaning section housing 24 extends down to below the level of the suspended article 16, to a lower edge 25a spaced slightly below the weir 54 and the upper edge 57 of the water wash sheet 56. The rectangular air flow opening 34 is below the level of the upper reservoir 52, and the upper portion of the front wall 35 above the opening 34 prevents overspray paint from impinging directly on the upper reservoir 52.

Preferably, each duct 40 has a cylindrical cross section including a short flared intake 58 segment at its lower end and a tubular segment 60 that enlarges gradually in diameter from the intake segment upward. The intake segment is usually located above four or five inches above the surface 62 of the lower reservoir 36 constricting the air flow to achieve a sufficient velocity in a region between the reservoir and the duct in order to lift water particles from the top surface of water in the reservoir. In order to entrain substantial amounts of water, air flow velocity at the duct entrances is at least about 5000 fpm. The high velocity air flow sucks water up through the ducts 40 and ejects it from the upper ends 44 at substantial velocity against the splash plate 47. Extending beneath each duct 40 and extending horizontally inward from the rear wall 27 of the tank and located about four or five inches below the water level is a surge baffle 64 that prevents cavitation in the lower reservoir 36 below the ducts 40 which cavitation would tend to reduce the amount of water that is entrained.

In accordance with the present invention, the amount of water being discharged from the blower 30 and the booth is reduced very substantially from that of conventional no-pump spray booths such as shown in U.S. Pat. No. 4,290,348. This is achieved shortening very substantially the height of the air ducts 40 and increasing very substantially the height of the plenum means above the ducts. By way of example only, the eleven foot vertical height for the illustrated booth has its turbulence panel 47 located at about one-half of the height of the booth or at about 5.5 feet, i.e. $L_1=L_2$ in FIG. 2. This is in contrast to U.S. Pat. No. 4,290,348 in which a splash plate 32 is located only a slight distance below the roof of the booth so that there is less time and distance for the air exiting the ducts to slow down and to drop water particles. With present invention, very few water particles leave the spray booth. The principal need for make-up water to be supplied to the main water reservoir is to replace the water used to humidify the air from ambient humidity at the booth entrance to 100% humidity after passing through the turbulence and first water wash. The dropping of water particles on surrounding equipment or onto automobiles or adjacent homes has been a very real problem, particularly because the water is often colored by contact with the paint.

More specifically, this is achieved by controlling the air flow velocities and distances in a controlled manner. With the air velocity of 5000 fpm through each of the ducts 40 which have a limited diameter at their upper ends discharging air and entrained water particles at a series of spaced locations against the underside of the turbulence panel 47 which is located at a substantial vertical distance below moisture eliminators 65, e.g., 2.5 feet and in a first plenum chamber 46 that is substantially wider than the upper diameters of the upper ends 40b ducts 40. Also, as best seen in FIG. 1, there is a considerable space between each duct discharge end 44 so that there is a very large volume space above the turbulence panel 47 into which the turbulent mixture of air and lifted water particles travel. The air velocity drops to within a range of 200–300 fpm after about a two foot vertical travel above the turbulence panel which velocity is substantially below the about 400 fpm velocity needed to keep the water particles entrained. The distance and time aspect is also important in that the water particles should have sufficient time and distance to slow down and to reverse the direction of travel, now under gravity, before leaving the spray booth.

To further assure that air borne water particles are not emitted from the booth, the eliminators 65 above the first plenum chamber 46 cause the air to deflect and take zig-zag paths therethrough to cause changes in direction of the air and to cause water particles because of their momentum to hit the eliminators and thus to be removed from the air. The preferred eliminators are chevron shaped plates 65a spaced from each other, as will be explained below. In the event any water particles should pass through the eliminators 65, the water particles should drop out in a further second plenum chamber 69 located above the eliminators 65.

The illustrated turbulence-creating panel 47 is a concave plate that extends from side wall to side wall 25 across the plenum 46 above the ducts, against which the entrained water impinges upon discharge from the ducts. The impact of the high velocity stream of air and water on the turbulence plate 47 creates a great deal of turbulence in this region, very efficiently mixing the air and water so that substantially all paint particles entrained in the air to this point are collected by water droplets. The concave configuration of the splash plate contributes to the turbulence by reversing the direction of air flow from upward to downward and by focusing the air and water particles splash back toward the center of the duct outlet, causing it to be turbently dispersed by the updraft through the ducts. The air and water must also travel in a front, lateral or rear direction to escape the turbulence area or zone between the turbulence panel 47 and the duct discharge end 44. As a result, of the turbulence plate 47 and other means for achieving paint particles removal efficiency, the booth removes about 99% of the paint particles from the air, a significant improvement of prior art designs. Thus, the turbulence plate 47 functions to divert the entrained water droplets from a direct upward path to the top of the plenum, further reducing the amount of water escaping the booth through the exhaust. The turbulence plate 47 is most effective for reducing water exhaust and for creating paint-scrubbing turbulence when it is disposed relatively close to the ducts 40, e.g., not more than about one-third of the way up from the bottom of the plenum 46 to the top of the plenum.

As a result of the reduced air flow in the plenum 46 relative to the air flow through the ducts 40 and further as a result of the diversion and turbulence created by the turbulence panel 47, the volume of water required for operation of the booth 10 is very dramatically reduced. Whereas some prior art booths using pumps require that the water volume in the booth be replaced two or three times during a working day, the booth of the present invention typically requires that only a small fraction of the water be replaced during a working day to make up for losses due to humidity, as above explained. Most droplets that reach the upper end of the plenum are caught by eliminator baffles 65a disposed between the blower chamber 28 and the plenum 46 and fall back to the plenum floor 48. The reduction in water reaching the upper end of the booth is dramatically illustrated by examination of the roof of the blower chamber 28, which after operation of the booth in an extended painting operation, remains substantially dry.

The illustrated partition 48 that provides the plenum floor is a horizontal panel from which depend the ducts 40 and drain tubes. The high velocity of flow through the ducts 40 prevents water that accumulates on the plenum floor 48 from falling back down through the ducts. Instead, the accumulated water on the upper side of the partition 48 flows to the drain tubes 50 that communicate with the upper reservoir 52. The lower ends of the drain tubes 50 depend below the level of the overflow weir 54 at the front side of the reservoir, resulting in the lower ends of the drain tubes being submerged. This prevents the tubes themselves from being a conduit for flowing air and entraining water in the manner of the ducts. A continuous drain of water through the tubes 50 creates a continuous overflow from the upper reservoir along the water curtain sheet 56. The use of a plurality of drain tubes 50 distributed evenly across the booth promotes even filling of the upper reservoir 52 and promotes a generally uniform overflow of water over the weir 54. The water curtain sheet 56 is tilted at a slight angle to the vertical with its lower end jutting toward the front of the booth 10 because it is found that the slight tilt of the curtain results in a slowing of the cascade and a evenly distributed cascade across the sheet.

In accordance with a further aspect of the invention, better and more uniform air flow across the workpiece is achieved from that of prior art no pump spray booths, such as shown in U.S. Pat. No. 4,290,348 by having the lower edge 59 of the water curtain sheet 56 spaced above the water surface in the reservoir by a distance very substantially larger than the distance between water surface and the lower edge of the ducts 40. This substantial increase in spacing has the advantage of having a lower air velocity at the air gap 34 than the air velocities at the air gap in the patented booth. For example, in the patented booth, the air velocity through the air gap may be about 4000 fpm whereas in the present invention the air flow velocity may be less than about 1500 fpm through the air gap 34. Very high air velocities through air gap deflect the water curtain and cause turbulence at the water surface below the water curtain sheet. More importantly, such high velocities cause a more directional downward flow of air back at the workpiece 16 where it is desired that the air flow be more horizontal in direction. Preferably, the spacing "D" (FIG. 2) of the lower sheet end 59 from the water surface 62 is at least 12 inches and preferably about 18 inches. This is about 3 to 4 times the spacing "DI" of the lower ends 42 of the ducts 40 from the surface (about 4 or 5 inches). In contrast, prior art booths have spaced the lower end of their sheets, a distance substantially equal to or just slightly greater than the spacing of the lower ends of the ducts from the water surface. As stated above, the result of increased spacing of the sheet end 59 from the water surface is that the air flow velocity below the sheet 56 is substantially less than the air flow velocity at the lower end of the ducts, which must be quite high in order that water be entrained. With a lower air flow velocity below the sheet 56, less turbulence is created in the curtain 20, that is, a more even flow of water cascades from the sheet to the reservoir and the air flow across the workpiece 16 is more uniform.

A significant percentage of overspray particles, e.g., 25–30%, are picked up by the water curtain 20. Additional particles are caught by the water in the tank 38 as the air flows horizontally rearward along the surface of the reservoir, and substantially all of the rest is removed by entrained water droplets in the ducts 40 and in the turbulent air-water mix 22 between the ducts 40 and the splash plate 66. For example, whereas the air flow velocity at the lower ends of the ducts is similar to other pump-less booths, i.e., in the 5000 fpm range, prior art booths typically generate air flow below the water curtain sheet 56 of about 4000 fpm whereas the booth of the present invention typically has an air flow velocity below the sheet of between about 1500 fpm or less. Substantially all of the overspray paint that is washed from the air by the recirculating water eventually accumulates in the tank 38 at the bottom of the housing 24. The paint particles, which are heavy relative to water, may be allowed to sink to the bottom of the tank from where they are periodically removed between periods of use of the booth for painting. Alternatively, paint particles may be held up by flocculant, as is known in the art, and the flocculant continuously skimmed from the tank.

As best seen in FIG. 1, the chevron shaped plates 65a are spaced from each other by spaces 65b through which the air flows. The air spaces 65b are relatively narrow and the air is first deflected to the right as viewed in FIG. 1 by the rightwardly and upwardly inclined lower section 65c of each eliminator plate 65a. The air then flows toward the central apex 65d of each eliminator plate; and just above this bend or apex 65, the air will hit the underside of an upwardly and leftwardly inclined upper section 65e. The air is given one last turn when it hits upper vertical flanges 65f at the upper edges of the eliminator plates 65a. The small spacing between adjacent eliminator plates and these changes in direction of air flow are intended to cause any airborne water particles to inprove onto the eliminator plates or to drop downwardly. From the eliminator 65 the air flows into and through the upper plenum to exit the booth at velocities below that needed to carry airborne water particles.

Features of the invention which give rise to important efficiencies can now be more fully appreciated. In the booth of the present invention, no more than about 1% of the overspray paint particles of the booth escapes through the exhaust, whereas in the best prior art designs, exhaust of overspray particles seldom dipped below 5% and not uncommonly remained over 15%. Increased paint particle removal can be attributed to the more even water cascade that results from a relatively low air flow velocity under the water curtain sheet and from the substantial turbulence caused by the rising column of air and water impacting the splash plate. Furthermore, a dramatic decrease in water use and discharge of water droplets from the booth exhaust results from the very substantial height and distance of the plenum above the ducts causing the air velocity to drop so substantially and causing air flow for a substantial time and for a significant distance at sub-entrainment speeds. Also, the turbulence plate causes water to splash in a direction generally opposite their upwardly flowing direction through the ducts and the eliminators and in extracting water droplets from the air.

While the invention has been described in terms of a preferred embodiment, modifications obvious to one with ordinary skill in the art may be made without departing from the teachings of the invention.

Various features of the invention are set forth in the following claims.

What is claimed is:

1. In a no-pump spray booth for removing air borne water and contaminant particulates, the combination comprising: a housing having a predetermined height for enclosing water washes and air travel, a lower water reservoir at the lower end of the housing for containing a body of water to have a predetermined water level range, a blower for pulling air through the housing at velocities to lift water vertically from the lower reservoir, a plurality of ducts having lower ends spaced above the water level at a predetermined distance to cause an entrainment of water particles for lifting from the body of water for upward flow through the ducts to discharge at upper ends of ducts, turbulence means located above the discharge ends of the ducts to deflect the air and entrained moisture and to cause a turbulence zone to wet air borne particulates to remove the same from the air stream, a plenum in said housing into which flows the air and air borne water particles from the turbulence zone for substantially reducing the air flow velocity to sub-entrainment velocity, an upper water reservoir located in the lower half of the housing for collecting and holding the water lifted through the ducts and deposited when the air velocity is reduced to sub-entrainment velocities in the plenum, a water curtain means located with its upper end in the lower half of the booth and conveying the water from the upper water reservoir in a curtain across the booth and downwardly to drop from a lower edge thereof as a waterfall across an air gap into the lower reservoir, the upper discharge ends of said ducts being located at or below the mid-height of the housing to provide the plenum with a vertical height and extent substantially equal to or greater than the one-half of the booth height, moisture eliminator means above the plenum to trap any moisture particulates flowing through the plenum, said eliminator means being located at least two and one-half feet above said turbulence means to provide a plenum of at least two and one-half feet in which the air velocity slows down to less than said sub-entrainment velocity for the water and contaminant particulates.

2. A no-pump spray booth in accordance with claim 1 in which the lower edge of the water curtain means is located above the water level in the lower reservoir at a distance at least twice the distance between lower ends of the ducts and the water level so as to provide a very substantial less velocity of air flow across the air gap than through the ducts.

3. A no-pump spray booth in accordance with claim 1 in which said turbulence means comprises:
   a concave panel located above each of the discharge ends of the ducts and curved to focus downwardly and inwardly toward the duct discharge ends, the air and water droplets emerging therefrom to cause mixing and turbulence to wet airborne particulates for removal.

4. In a spray booth, the combination of a front user portal whereat a user directs a spray of paint at an article and a cleaning section behind the user portal comprising a housing having vertical front, rear and side walls, partition means separating an upper plenum from a lower region, an opening in said front wall communicating said lower region to said user portal, a lower water reservoir at the lower end of said housing, an upper reservoir disposed within said lower region above said lower reservoir, sheet means depending from said upper reservoir and having a lower edge spaced above said lower reservoir for creating a curtain of cascading water from water overflowing said upper reservoir and for discharging a waterfall of water across an air gap to the lower water reservoir therebelow, vertical duct means extending at a lower end from just above said lower reservoir to said plenum, tube means for communicating said plenum to said upper reservoir, an exhaust above said partition means, blower means for creating an air flow through said booth in a flow path rearward through said user portal, through said opening, through said water curtain between said sheet means and said lower reservoir, through said duct means to said plenum and out through said exhaust, splash plate means disposed above said duct means for interdicting the upward movement of water sprayed upward into said plenum, said blower means creating an air flow of sufficient intensity that a substantial amount of water from said lower reservoir is entrained by a high velocity air flow upward through said duct means and discharged against said splash plate means for flow into said plenum, the water discharged into said upper plenum draining through said tube means, water of said curtain and water of said discharge into said plenum collecting overspray paint particles from the flowing air and depositing the particles in said lower reservoir, and moisture eliminator means in said upper plenum said upper plenum having an enlarged air flow passageway of at least two and one-half feet in height above said splash means for reducing the velocity of air in said plenum upwards of said partition means to a velocity below a water entrainment velocity, thereby substantially eliminating water particulates from being carried by said air flow out through said exhaust so that said exhaust and the area surrounding the exhaust will remain dry.

5. A spray booth according to claim 4 wherein air flow velocity in said duct means is about 5000 fpm, whereas air flow velocity in an upper end of said plenum is less than about 400 fpm.

6. A spray booth according to claim 4 wherein said splash plate means is disposed above said duct means less than about one-third of the distance from said duct means to the upper end of said plenum.

7. A spray booth according to claim 4 having a chamber above said plenum wherein said blower is contained, said exhaust leading from said chamber.

8. A spray booth according to claim 7 having baffle means between said plenum and said chamber for eliminating water from air flowing to said chamber.

9. In a spray booth, the combination of a front user portal where at a user directs a spray of paint at an article and a cleaning section behind the user portal comprising a housing having vertical front, rear and side walls, partition means separating an upper plenum from a lower region, an opening in said front wall communicating said lower region to said user portal, a lower water reservoir at the lower end of said housing, an upper reservoir disposed within said lower region above said lower reservoir, sheet means depending from said upper reservoir and having a lower edge spaced above said lower reservoir for creating a curtain of cascading water from water overflowing said upper reservoir, vertical duct means extending at a lower end from just above said lower reservoir to said plenum, tube means for communicating said plenum to said upper reservoir, an exhaust above said partition means, and blower means for creating an air flow through said booth in a flow path rearward through said user portal, through said opening through said water curtain between said sheet means and said lower reservoir, through said duct means to said plenum and out through said exhaust, said blower means creating an air flow of sufficient intensity that a substantial amount of water from said lower reservoir is entrained as water particulates by a high velocity air flow upward through said duct means and discharged into said plenum, splash means in the plenum for intercepting the upward flow of water particles in said duct means and for causing a turbulent mixture of water particles and air borne overspray particles in the lower portion of the upper plenum, said upper plenum being enlarged and extending above the splash means to reduce the velocity of said air flow and of the air borne water particles to sub-entrainment velocities, the water discharged into said upper plenum draining through said tube means, water of said curtain and water of said discharge into said plenum collecting overspray paint particles from the flowing air and depositing the particles in said lower reservoir, said lower edge of said sheet means being spaced above said lower reservoir at least about three times the distance that said lower end of said duct means is spaced above said lower reservoir, whereby the velocity of air flow below said sheet means is substantially less than the air flow velocity through said ducts, promoting formation of a more even water curtain and better removal of paint particles from the flowing air.

10. A spray booth according to claim 9 wherein the air flow velocity below said sheet means is less than about 1500 fpm.

11. A method of removing paint contaminant air borne particles in a booth by water, comprising the steps of:

flowing water in a vertical curtain down a sheet means and directioning a stream of air toward the vertical water curtain to wet contaminant particles, flowing the air stream of air through a gap formed between the lower end of the water curtain sheet means and the water surface of the water in a water reservoir below the sheet means, at a predetermined velocity of less than 2000 fpm, flowing air across a reservoir of water in a liquid reservoir to inlets of a plurality of vertical ducts at a velocity of at least 4000 fpm to lift water from the reservoir and to entrain water for flow upward through the ducts, impacting the air and water against a turbulence generating means to cause a turbulent mixture of water and air above the discharge ends of said ducts to wet the contaminant particulates in the air stream, collecting the water dropping from the turbulence generating means and flowing the water to the upper end of the water curtain for flow down the water curtain, slowing down the air stream to a velocity of less than 400 fpm in an enlarged plenum chamber located above the turbulence means to drop out substantially all water particles from the air stream, discharging a dry air stream from an exhaust duct for the booth without wetting the exhaust and surrounding area with water carrier from the booth above the plenum, and discharging a air stream from an exhaust duct for the booth from which 99 percent of the paint particulates have been removed.

* * * * *